United States Patent [19]
Tanikoshi

[11] 4,039,911
[45] Aug. 2, 1977

[54] DC MOTOR CONTROLLED BY HALL GENERATOR

[75] Inventor: Kinji Tanikoshi, Kawasaki, Japan

[73] Assignees: Canon Kabushiki Kaisha; Canon Seiki Kabushiki Kaisha, both of Tokyo, Japan

[21] Appl. No.: 588,697

[22] Filed: June 20, 1975

[30] Foreign Application Priority Data

June 24, 1974 Japan .................................. 49-72121

[51] Int. Cl.² .......................................... H02K 29/00
[52] U.S. Cl. .................................. 318/254; 318/138; 318/256; 318/286
[58] Field of Search ........ 318/138, 254, 256, 280–283, 318/286, 287, 291, 293

[56] References Cited
U.S. PATENT DOCUMENTS

| | | |
|---|---|---|
| 3,440,506 | 4/1969 | Krestel et al. ................... 318/254 X |
| 3,716,769 | 2/1973 | Brunner ............................. 318/254 |
| 3,881,142 | 4/1975 | Endo et al. ....................... 318/254 X |
| 3,896,357 | 7/1975 | Tanikoshi .......................... 318/254 |
| 3,916,272 | 10/1975 | Grunleitner et al. ........... 318/254 X |
| 3,942,083 | 3/1976 | Takahashi et al. .............. 318/254 X |

Primary Examiner—Gene Z. Rubinson
Attorney, Agent, or Firm—Fitzpatrick, Cella, Harper & Scinto

[57] ABSTRACT

A DC motor is controlled by a Hall generator provided in a control circuit which detects the voltage equivalent to the terminal voltage of a driving means connected to the flux-producing windings positioned in torque-producing relation to the rotor, and regulates to always keep the terminal voltage of the driving means constant.

18 Claims, 23 Drawing Figures

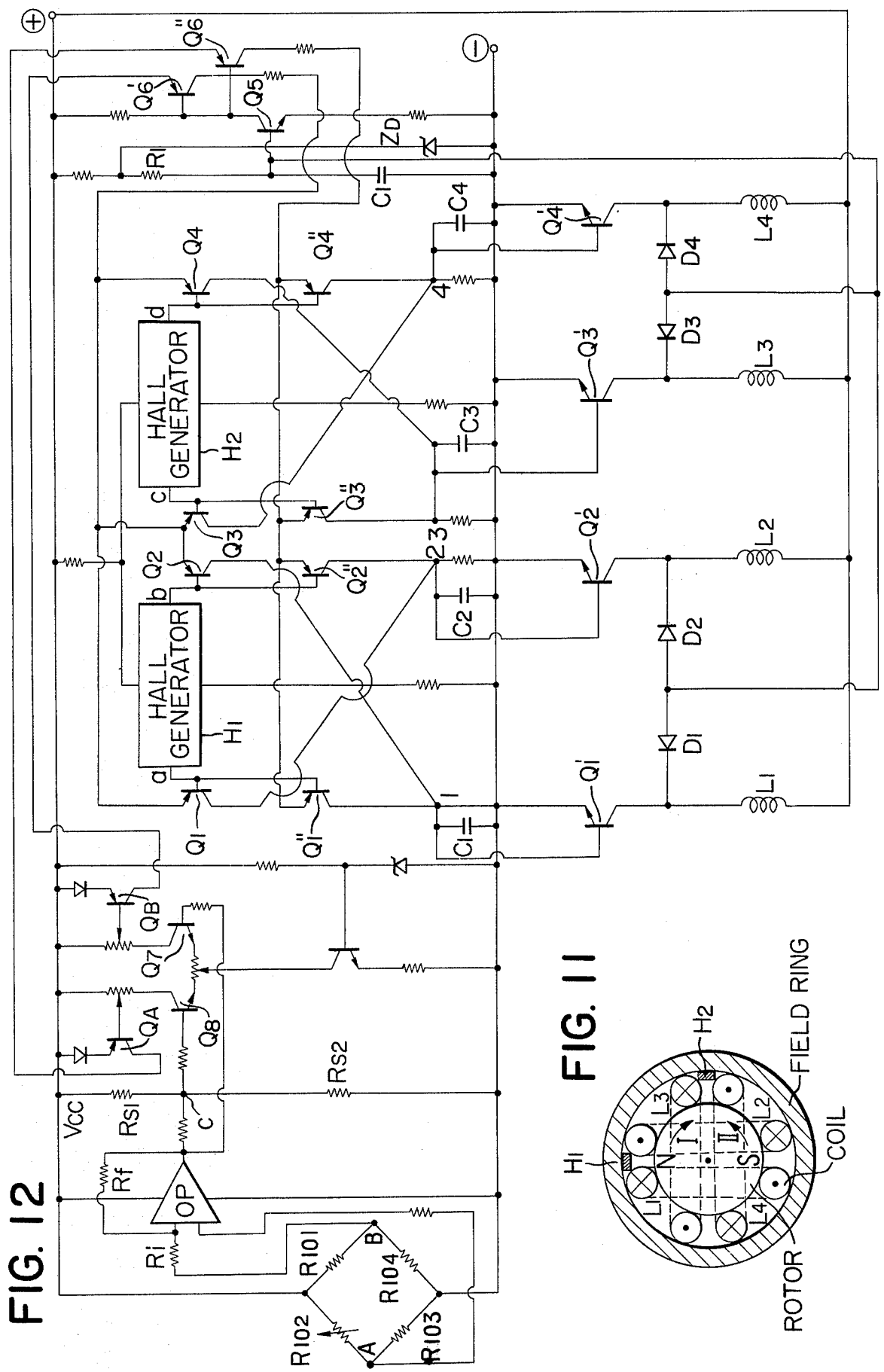

DC MOTOR CONTROLLED BY HALL GENERATOR

BACKGROUND OF THE INVENTION

1. Field of the Invention

This invention relates to a driving circuit for a DC motor controlled by Hall generators or more particularly to a driving circuit for a DC motor which does not need a control for keeping the revolution of the motor at a fixed speed.

2. Description of the Prior Art

Heretofore, the driving circuit for a DC motor controlled by Hall generator of the type having no constant speed control has been controlled not by controlling the Hall element input signals particularly, but by a fixed input. This causes a voltage to remain on the transistor receiving the Hall element input signals when a load is applied to the motor, and the current which runs through the field coil does not increase in proportion to the increase of the load torque. Therefore, this type of driving circuit has a drawback in that the motor speed-load torque characteristic is degraded because the current running through the field coil does not increase in proportion to load torque, and the relationship between load torque and motor speed is not proportional.

It was also attempted to control the motor speed by increasing the supply voltage. However, since this causes no change in the conductivity of the transistor receiving the Hall element input signals and since, as a result, the increased amount of supply voltage is applied across the emitter and collector of the transistor, the electric current running through the field coil connected to the transistor does not vary linearly with respect to the change in the supply voltage. Accordingly the speed of the motor does not vary linearly with respect to the change in the supply voltage and a great inconvenience is caused because it was impossible to control the motor speed at will.

In order to remove such defects, a method in which the transistor is saturated in advance was also considered. According to this method, however, since the driving transistor connected to the field coil of each phase becomes perfectly conductive pulsewise, phases with which driving currents run through each adjacent coil are superimposed and, in addition, since an electric current which rises linearly runs through the driving coils a magnetic field nonuniform to the rotor is generated.

As a result, this method has the drawback of generating irregular rotary torque, generating pulsed signals from the driving coil which act on each element of the driving coil as noises, and causing erroneous operation to occur.

SUMMARY OF THE INVENTION

An object of the present invention is to provide a driving circuit for a Hall motor in which the aforementioned drawbacks are removed.

Another object of the present invention is to provide a driving circuit for a Hall motor in which the conductivity of the driving transistor is detected and the Hall element input is automatically controlled to maintain the conductive state always at normal state.

A further object of the present invention is to provide a driving circuit for a Hall motor in which the conductive state of the driving transistor is detected, control is made to maintain the conductive state at a specified value, the varied amount of the supply voltage is applied to the field coil, and the motor speed varies linearly with respect to the change in the supply voltage.

Other objects of the present invention will be obvious from the contents of the detailed description of the present invention which will be explained hereinafter referring to the drawings.

BRIEF DESCRIPTION OF THE DRAWINGS

FIG. 11 is a structural drawing of the motor showing the relationship between the field coil of the driving circuit shown in FIG. 10 and the rotor of the motor.

FIG. 12 is a circuit diagram showing an embodiment in which the inventive Hall motor driving circuit is applied to a servo system.

DESCRIPTION OF THE PREFERRED EMBODIMENTS

Figure 1:
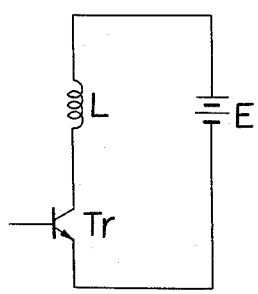
FIG. 1 is a partial drawing of a circuit showing one example of the conventional driving circuit of the motor.

FIG. 1 is a circuit diagram showing a portion of the circuit configuration representing an embodiment of a conventional motor driving circuit.

Figure 2:
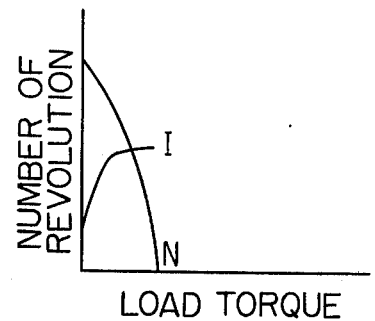
FIG. 2 is a characteristic drawing showing the characteristics of the driving circuit shown in FIG. 1.

FIG. 2 is a characteristic drawing showing the characteristics of the driving circuit shown in FIG. 1 in which the speed is plotted on the vertical axis and the load torque on the horizontal axis.

In FIG. 1, E is a power supply, L is a field coil, and Tr is a transistor. The base of said transistor Tr is connected to the Hall element (not shown). Assume now that the Hall voltage from the Hall element is constant. Then the base current $I_B$ of the transistor Tr and also the collector current Ic become constant. Under this condition, if the load torque is increased, the current running through the field coil is normally increased in proportion to the load torque. However, since the collector current of the transistor is constant as mentioned above, the current running through the field coil does not increase proportionally to the load torque but shows the characteristics as shown in FIG. 2. Moreover, in normal cases increase in the voltage applied to the driving circuit caused by increasing the supply voltage E will result in an increase in the voltage applied to the field coil and in the speed of the motor being increased proportionally. However since the current running through the field coil is controlled by the transistor and since the collector current is constant, increase in the supply voltage does not cause the current running through the field coil to vary linearly and only the voltage applied across the collector and emitter of the transistor is increased. In other words, it is impossible to adjust the motor speed linearly.

Figure 3:
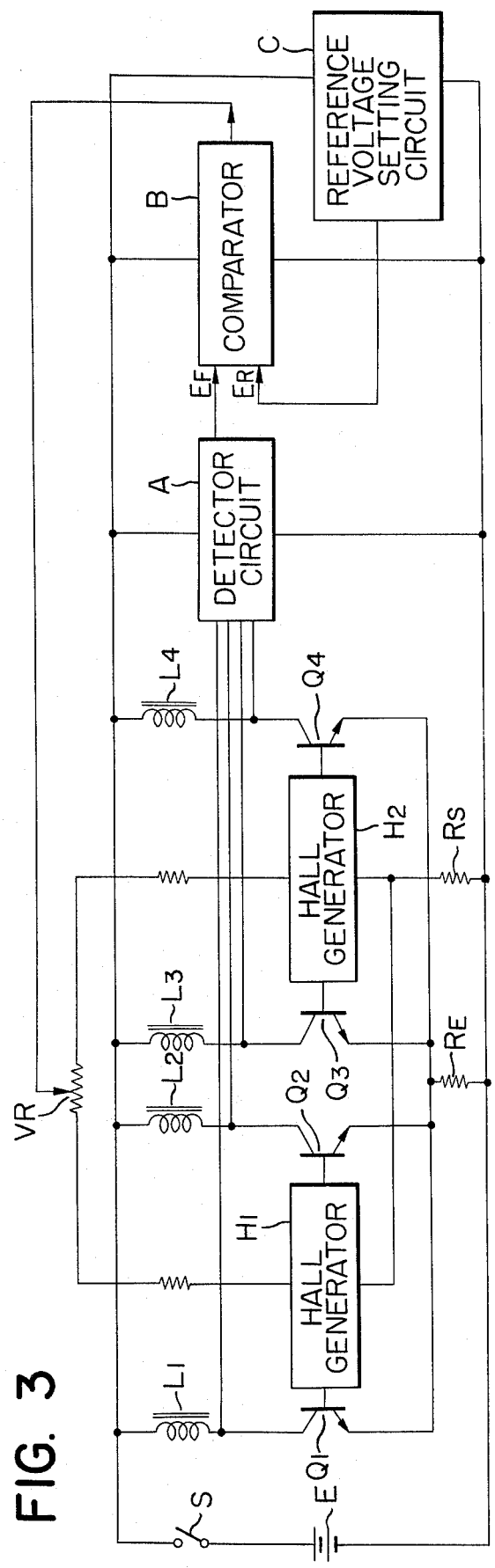
FIG. 3 is a circuit diagram showing an embodiment of the Hall motor driving circuit of the present invention.

FIG. 3 is a circuit diagram showing the inventive Hall motor driving circuit in which drawbacks contained in the conventional circuit shown in FIG. 1 have been removed. In FIG. 3, $L_1$ through $L_4$ are field coils established on the stator of the motor; $H_1$ and $H_2$ are Hall elements by which the position of the magnetic poles of rotor, which are not illustrated, is detected and the Hall voltage is generated; $Q_1$ through $Q_4$ are driving transistors; RE is an emitter resistor common to $Q_1$ through $Q_4$. A is a circuit used to detect the conductivities (output impedances) of the transistors $Q_1$ through $Q_4$, B is a comparison circuit, C is a reference voltage setting circuit, and VR is a variable resistor used to compensate for the nonuniformity in Hall elements $H_1$ and $H_2$.

Next, the operation of FIG. 3 will be explained. In the case where, under the condition when the power switch S is in the ON state, the position of the rotor (not illustrated) is detected by Hall elements $H_1$ and $H_2$, the driving current is run selectively through the field coils $L_1$ through $L_4$, which correspond to the rotor position, by bringing the transistors $Q_1$ through $Q_4$ sequentially into an ON state to rotate the rotor, and the conductivities of the transistors $Q_1$ through $Q_4$ are changed, i.e., as the conductivity of the transistor $Q_1$ is increased, the voltage $V_{CE}$ across the collector and emitter of $Q_1$ is decreased. This is detected by the circuit A, used to detect the conductivity and transmitted to the comparison circuit B. On the other hand, since a constant voltage ER is applied to the other input terminal of said comparison circuit B by the reference voltage setting circuit C, this voltage is compared with the voltage EF which corresponds to the conductivity of transistor $Q_1$, as detected by the circuit A.

Since EF is lower than ER now because the conductivity of the transistor $Q_1$ is increasing as mentioned above, an output which corresponds to the difference between EF and ER and which is generated from said comparison circuit works to control the current applied to Hall elements $H_1$ and $H_2$ to decrease and always control the conductivities of transistors $Q_1$ through $Q_4$, or $V_{CE}$, to be constant. When the conductivities of the transistors $Q_1$ through $Q_4$ are reduced, control is made, contrary to the above-mentioned case, to increase the current applied to the Hall elements from the comparison circuit B to make constant the conductivities of the transistors $Q_1$ through $Q_4$.

Figure 4:
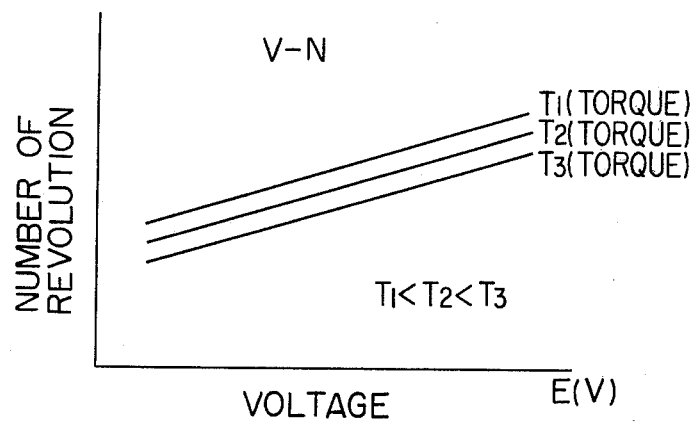
FIG. 4 is a characteristic drawing showing voltage-speed characteristics the Hall motor driving circuit of the present invention.
Figure 5:
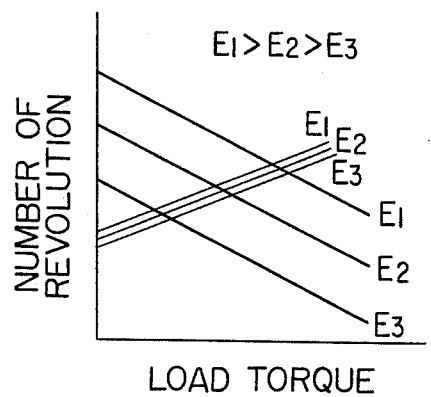
FIG. 5 is a characteristic drawing showing load torque-speed characteristics of the inventive driving circuit.

As mentioned above, in the circuit shown in FIG. 3, since control is made always to keep $V_{CE}$ of transistors $Q_1$ through $Q_4$ constant, if there is a change in the supply voltage, the changed amount is applied across each of the field coils $L_1$ through $L_4$. As a result, the motor speed can be controlled linearly with respect to the change in supply voltage as shown in FIG. 4. Moreover, in the case where the load torque is increased as shown in FIG. 5, the current running through the field coil can be increased linearly and also the motor speed varied linearly.

Figure 6:
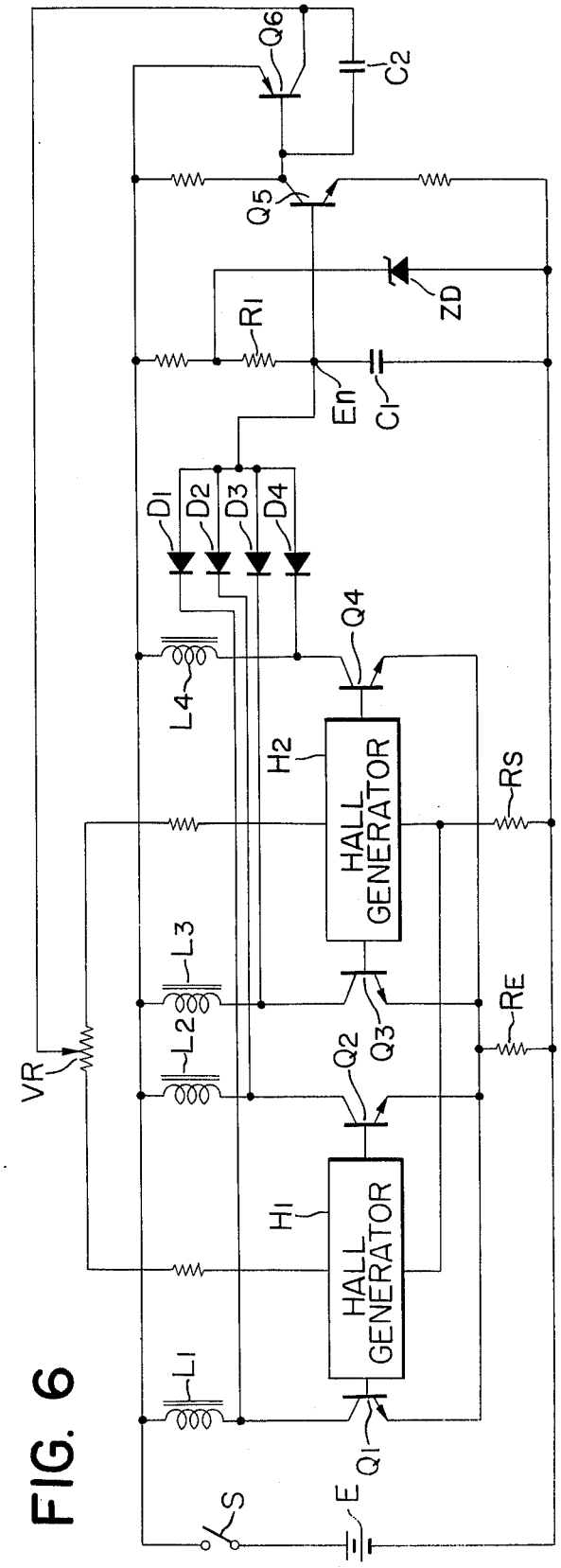
FIG. 6 is a circuit diagram showing the detailed circuit configuration of the circuit shown in FIG. 3.

FIG. 6 shows a circuit connection of an embodiment of the inventive driving circuit in which the same symbols are used to represent the same parts shown in FIG. 3. In FIG. 6, $D_1$ through $D_4$ are diodes forming a circuit (A in FIG. 3) used to detect the conductivities of the driving transistors $Q_1$ through $Q_4$. These diodes have the function of preventing the induced voltage from being transmitted to $Q_5$ when the coils are in a de-energized state. $R_1$ and $C_1$ are the resistor and condenser of a time constant circuit, and condenser $C_2$ has the function of compensating for the ripple constituent to smoothen the voltage. ZD is a Zener diode forming a constant voltage source. $Q_5$ and $Q_6$ are control transistors and $C_2$ is a condenser used to obtain stabilized operation.

Figure 7A:
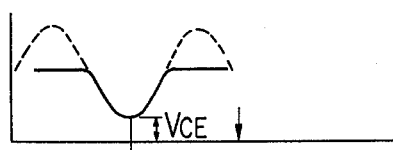
FIGS. 7A-7E are waveform diagrams showing the terminal voltages of the driving transistors $Q_1$ through $Q_4$ shown in FIG. 6.
Figure 7B:
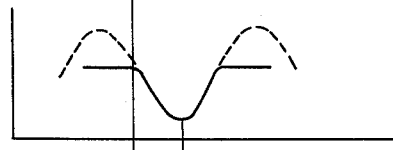
Figure 7C:
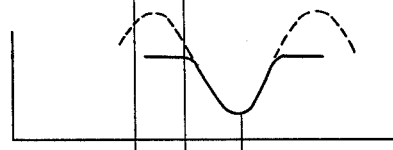
Figure 7D:

The operation of FIG. 6 will be explained. Upon turning ON the power switch S, the voltage En of $C_1$ is charged up at the time constant determined by $R_1$ and $C_1$ by the constant voltage source formed by ZD. The potential of En causes the transistors $Q_5$ and $Q_6$ of the control circuit to go into operation and a current runs to the inputs of Hall elements $H_1$ and $H_2$. Assume that the $Q_1$ side output of $H_1$ is (+) caused by the position of the rotor consisting of a permanent magnet. Then the transistor $Q_1$ becomes conductive and this causes the $V_{CE}$ voltage of the transistor $Q_1$ to vary as shown in FIG. 7(a). Thereafter the Hall voltages of Hall elements $H_1$ and $H_2$ are generated sequentially depending on the position of the rotor and the transistors $Q_2$ through $Q_4$ become conductive. Therefore, the $V_{CE}$ voltage of each transistor varies as shown in FIG. 7(b), (c), (d), and as their composite waveform a waveform shown in FIG. 7(e) can be obtained.

Figure 7E:

If by some cause or other the conductivities of driving transistors $Q_1$ through $Q_4$ are increased, the voltage waveform shown in FIG. 7(e) is reduced in level and the current of $C_1$ discharged through the diodes $D_1$ through $D_4$ is also increased. Accordingly, the output of the control circuit $Q_5$ and $Q_6$ is also reduced, resulting in a reduction in the current from the Hall element input circuit. As a result, since the Hall voltage is also reduced as well as the conductivity of the driving transistor controlled by the Hall voltage, the driving circuit returns to the constant driving state.

In the case where the conductivities of transistors $Q_1$ through $Q_4$ are reduced, the driving state is also returned to the constant state similarly but by an opposite operation.

In this case when the conductivity of $Q_1$ is reduced, and if the $V_{CE}$ voltages of the transistors $Q_1$ through $Q_4$ stay within the range not exceeding the voltage determined by the Zener diode ZD, the voltage $V_{CE}$ is increased to cause the base voltage of the transistor $Q_5$ to increase. As a result, the input current to the Hall elements $H_1$ and $H_2$ applied through the transistor $Q_1$ is increased, resulting in an increase in the conductivity of the transistor $Q_1$ to obtain a constant driving state. As mentioned above, similar to the case of the embodiment shown in FIG. 3, in the case of the embodiment shown in FIG. 6 transistors are always so controlled as to obtain a constant $V_{CE}$ voltage in order to run current constantly through the field coils. Therefore the motor speed can be changed linearly with respect to the change in supply voltage by applying the changed amount of voltage to the field coils.

Next, another embodiment of the inventive Hall motor driving circuit shown in FIG. 8 will be explained.

Figure 8:
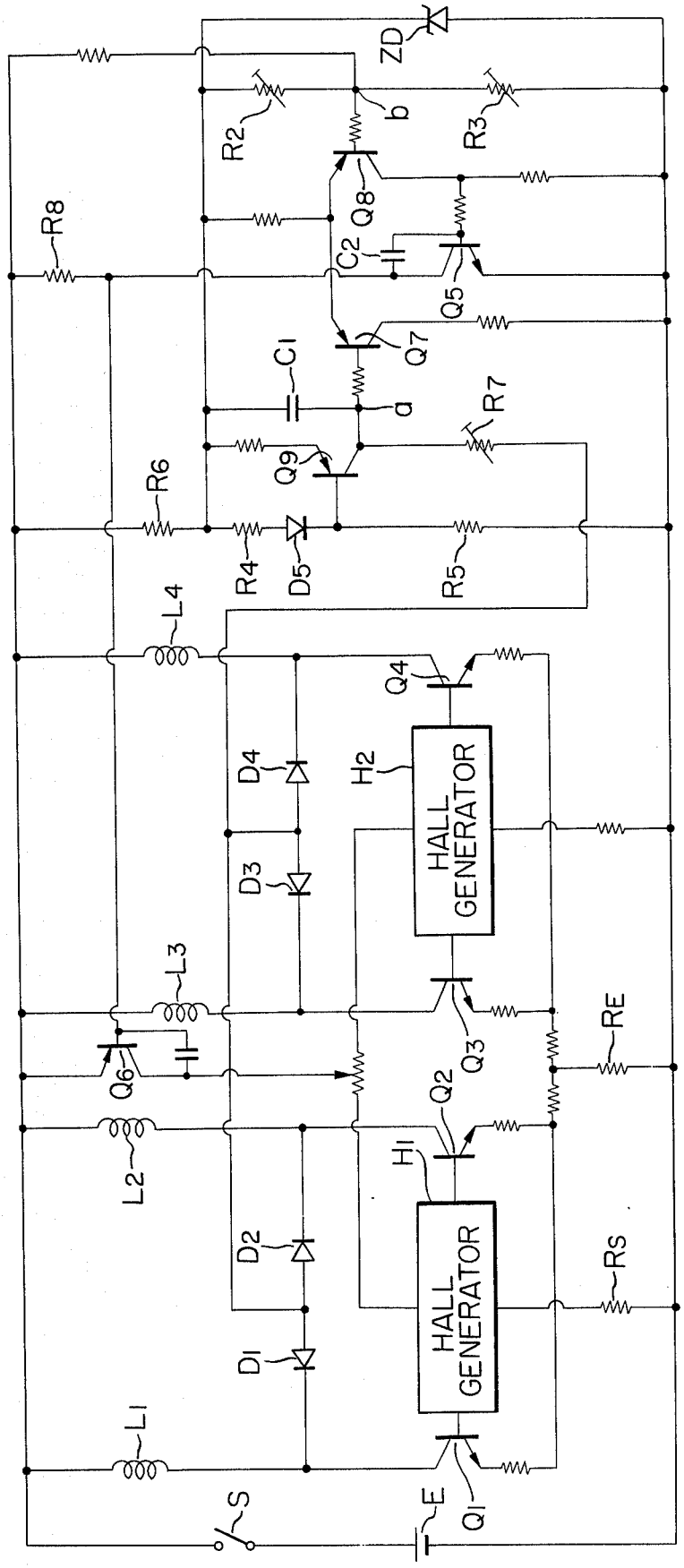
FIG. 8 is a circuit diagram showing another embodiment of the present invention.

Among the circuit components shown in FIG. 8, those which have the same structure and operation as the circuit components shown in FIG. 6 bear the same symbols. However, the difference is that in said embodiment a differential amplifier consisting of transistors $Q_7$ and $Q_8$ is used in the comparison circuit, and that a constant current circuit consisting of transistor $Q_9$ and resistors $R_4$, $R_5$, $R_7$, and diode $D_5$ are provided at one input terminal of said differential amplifier to apply the $V_{CE}$ voltages of driving transistors $Q_1$ through $Q_4$ to the differential amplifier after shifting the level of $V_{CE}$ voltage by a predetermined amount. At the same time, a constant voltage is applied to the differential amplifier by Zener diode ZD, and resistors $R_2$ and $R_3$, and a constant reference voltage is given to the differential amplifier.

Now the operation of the embodiment shown in FIG. 8 will be explained. Normally, said circuit drives the rotor by the operation explained in detail in the embodiment shown in FIG. 6.

However, the case where the conductivities of the transistors $Q_1$ through $Q_4$ have been changed by some cause or other, i.e., if the conductivity of $Q_1$ is increased and the $V_{CE}$ voltage of $Q_1$ is reduced, since the voltage at point a is reduced by the amount reduced in $V_{CE}$, the conductivity of the transistor $Q_7$ is increased and accordingly the conductivity of the transistor $Q_8$ is reduced, along with the conductivities of the transistors $Q_5$ and $Q_6$.

Therefore the input current to the Hall elements $H_1$ and $H_2$ is reduced and the Hall voltage to the transistors $Q_1$ through $Q_4$ is also reduced. As a result, the conductivities of transistors $Q_1$ through $Q_4$ are reduced, resulting in the return of $V_{CE}$ to a value which corresponds to the reference voltage. If, on the contrary, the conductivity of the transistor $Q_1$ is reduced, i.e., the $V_{CE}$ is increased, the conductivities of control transistors $Q_5$ and $Q_6$ are increased, the conductivity of the transistor $Q_1$ is increased, and $V_{CE}$ is returned to a value which corresponds to the references voltage. In this way, since control is made so that the $V_{CE}$ of the driving transistor Q is always constant, the motor speed varies linearly with respect to the change in supply voltage and also linearly with the load torque.

Figure 9:
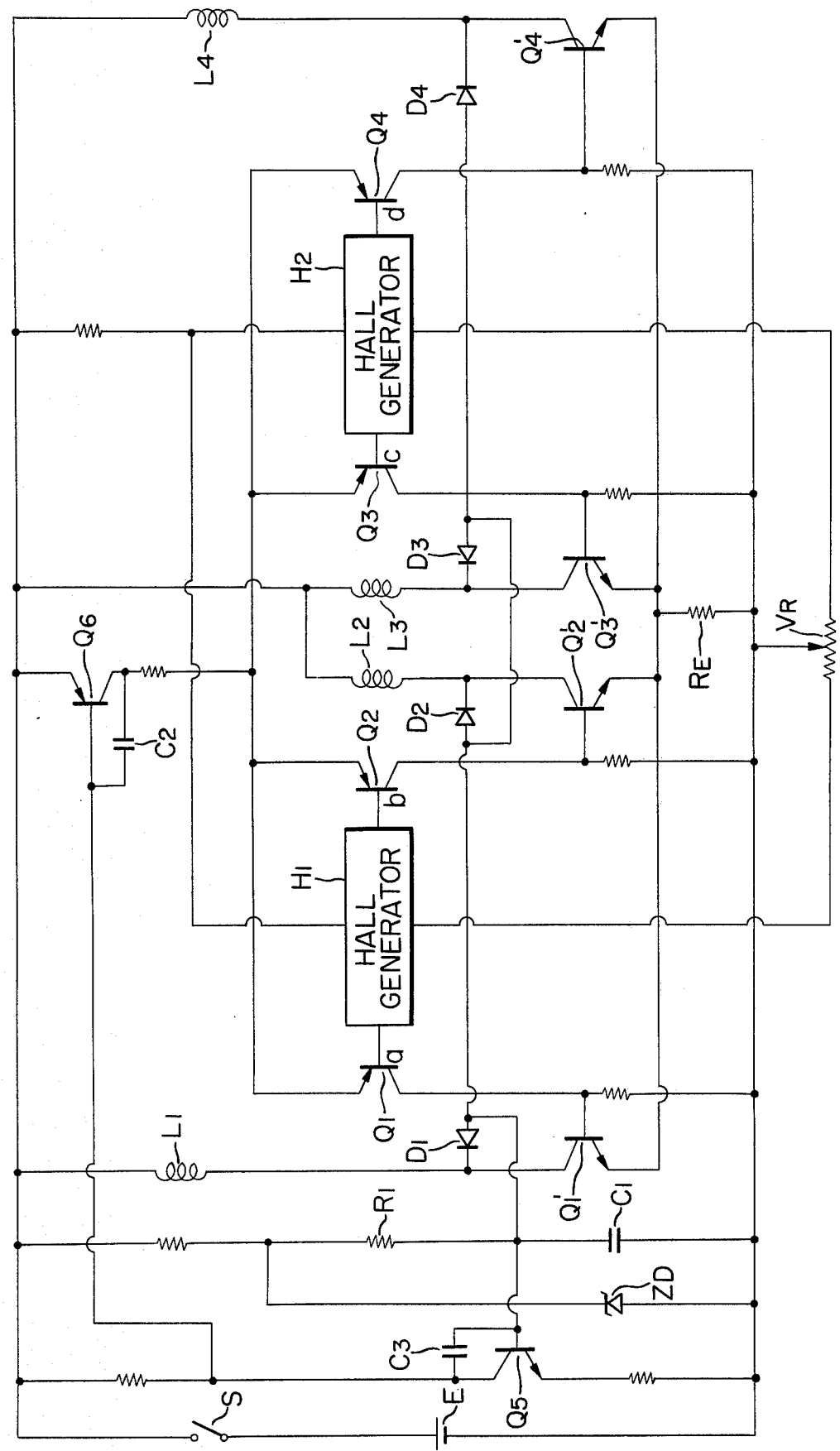
FIG. 9 is a circuit diagram showing a further embodiment of the present invention.

FIG. 9 is a circuit diagram showing another embodiment of the inventive Hall motor. Although the same symbol is used for each circuit component which has the same configuration and operation as the one contained in the circuit shown in FIG. 6, said embodiment differs from the other in that the input to the Hall elements is made constant, that the outputs of the transistors $Q_1$ through $Q_4$ connected to the Hall elements are subjected a to 2-stage amplification by the transistors $Q'_1$ through $Q'_4$, that, at the same time, in order to detect and control the conductivities of driving transistors $Q'_1$ through $Q'_4$, the collector of the transistor $Q_6$ is connected to the above-mentioned transistors $Q_1$ through $Q_4$ to regulate the conductivity of $Q_6$ and accordingly the conductivities of the transistors $Q_1$ through $Q_4$. The operation of said embodiment will now be explained.

In normal cases, similar to the case of the embodiment shown in FIG. 6, the Hall elements detect the position of the rotor, change over the field coils sequentially, and pass a current through them to rotate the rotor. However, if the conductivities of the transistors $Q'_1$ through $Q'_4$ have been changed by some cause or other, i.e., if the conductivity of $Q'_1$ has increased, the $V_{CE}$ of $Q'_1$ is reduced and accordingly the base potential of the transistor $Q_5$ is also reduced. Therefore the conductivities of the transistors $Q_5$ and $Q_6$, and accordingly the input current to the transistor $Q_1$ are reduced. As a result, the base potential of the transistor $Q'_1$ and its conductivity are reduced. Then the $V_{CE}$ is increased and the driving circuit returns to a predetermined state. On the contrary, in the case where the conductivity of $Q'_1$ has been reduced, the predetermined state is reached through operations quite reverse to the operations involved in the above-mentioned case. In this way, in the case of the embodiment shown in FIG. 9, control is always made, similar to the case of the embodiment shown in FIG. 6, so that the $V_{CE}$ of the driving transistor takes a constant value. This means that the speed of the motor varies linearly with respect to the supply voltage and to the load torque.

Figure 10:
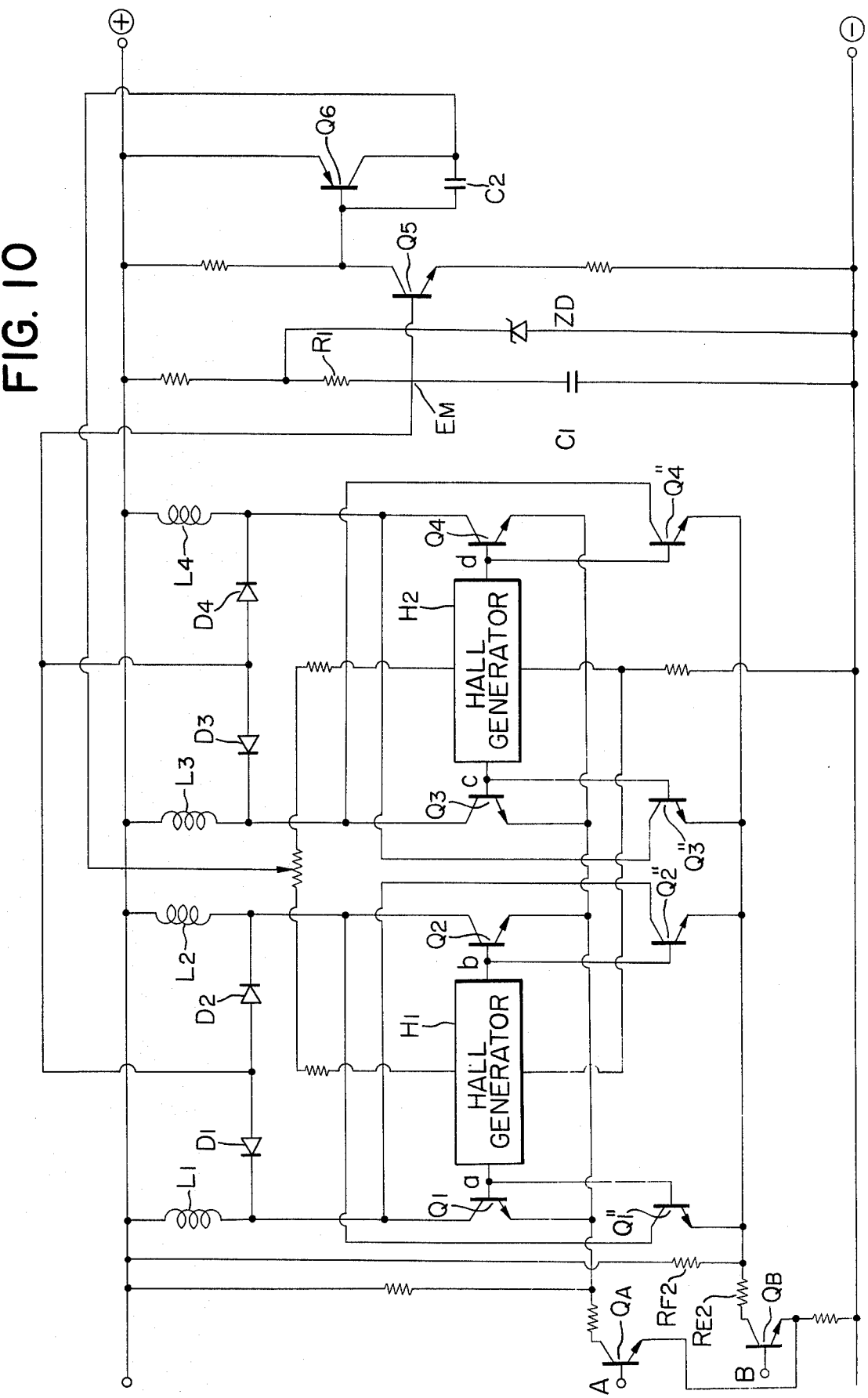
FIG. 10 is a circuit diagram of an embodiment consisting of the inventive Hall motor driving circuit and a forward-backward running device attached to the driving circuit.
Figure 13A:
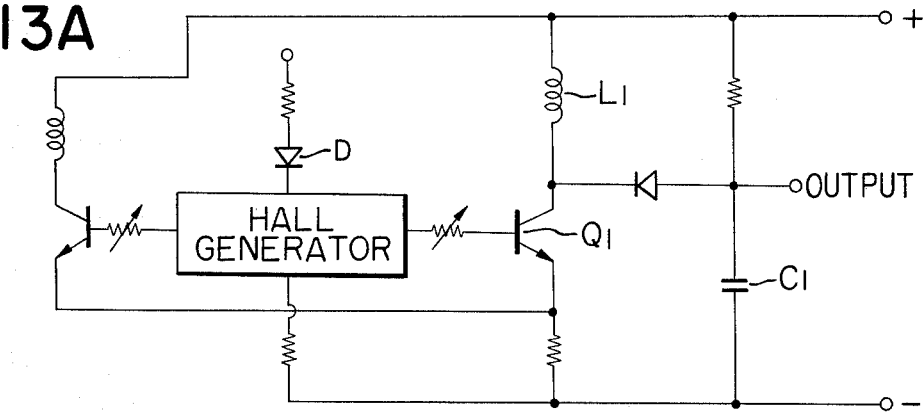
FIGS. 13A-13D are circuit diagrams showing an embodiment of the detecting circuit of the inventive Hall motor driving circuit.
Figure 13B:
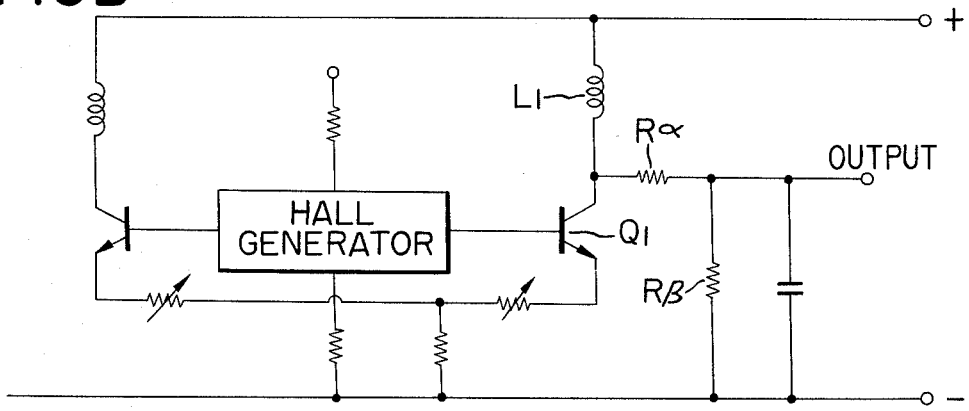
Figure 13C:
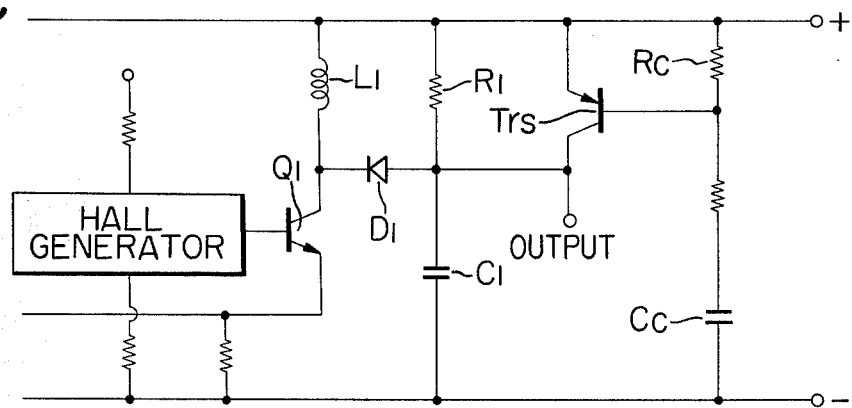
Figure 13D:
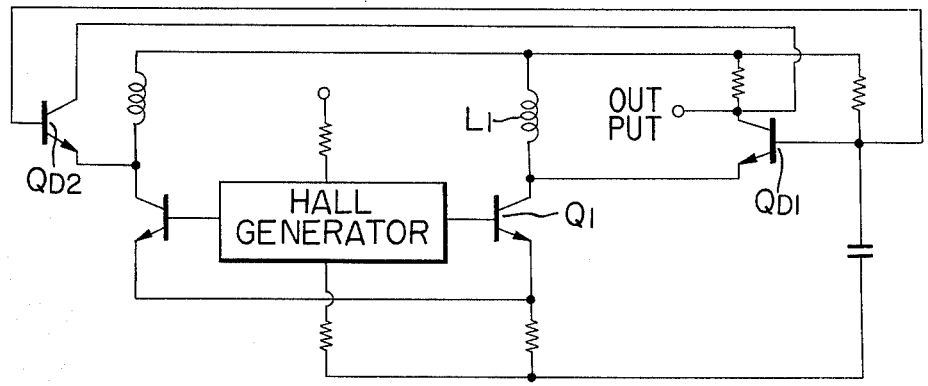

FIG. 10 is a circuit diagram of a Hall motor driving circuit formed by providing driving transistors $Q''_1$ through $Q''_4$ in the inventive Hall motor driving circuit shown in FIG. 6. The difference between these two circuits lies in that in the present circuit the transistors $Q''_1$ through $Q''_4$ are used to drive the field coils $L_1$ through $L_4$ connected to transistors $Q_1$ through $Q_4$ in such a way that the coils which are out-of-phase by 180° with respect to the driving state of the transistors $Q_1$ through $Q_4$, are excited and that the transistors $Q_A$ and $Q_B$ are connected to driving transistors $Q_1$ through $Q_4$ and $Q''_1$ through $Q''_4$ respectively to enable the motor to be rotated forward or backward by selectively making said transistors $Q_A$ and $Q_B$ conductive.

Now the operation of the embodiment shown in FIG. 10 will be explained. Since the operation of said embodiment is almost equal to the operation of the embodiment shown in FIG. 6, detailed explanation will be omitted and only the forward and backward operation of the motor will be explained. A positive potential is applied to point A. The transistor $Q_A$ is turned ON and a current path is established between $Q_A$ and the transistors $Q_1$ through $Q_4$. Under this condition, if the N pole of the rotor shown in FIG. 11 passes by the Hall element $H_1$, a Hall voltage is generated at point a of the Hall element $H_1$, the transistor $Q_1$ is turned ON, and a driving current runs through the field coil $L_1$ to rotate the rotor. Thereafter, positive Hall potential is generated at point C of the Hall element $H_2$, point b of $H_1$, and point d of $H_2$, and the driving current runs through the transistors $Q_1$, $Q_3$, $Q_2$ and $Q_4$ in that order or through the field coils $L_1$, $L_3$, $L_2$ and $L_4$ in that order to rotate the rotor in the direction of the arrow I. For rotating said rotor to the reverse direction a positive potential is applied at B point of the transistor $Q_B$, said transistor is turned ON and there is established a current path to the transistors $Q_1$-$Q_4$. In such condition, when the N pole of the rotor R passes by the Hall element $H_1$ as shown in FIG. 11, a positive Hall voltage is generated at point a of the Hall element $H_1$, thereby the transistor $Q''_1$ is turned ON and current flows in the field coil $L_2$, the magnetic field of the coil $L_2$ acts on the S pole of the rotor to rotate the rotor in the direction of arrow II, and the S pole of the rotor passes by the Hall element $H_2$. As a result, a positive Hall potential is generated at point d of the Hall element $H_2$, the transistor $Q''_4$ is turned ON, a driving current runs through the field coil $L_3$, and the rotor R rotates further in the direction of arrow II. Thereafter, positive Hall potentials are generated sequentially at points b and c of the Hall elements, and the driving current runs through the transistors $Q''_2$ and $Q''_3$ and accordingly through the field coils $L_1$ and $L_4$, in that order. Therefore, the rotor rotates in the direction opposite to the direction in the above-mentioned case. Also in said embodiment the same effect as described in the case of the embodiment shown in FIG. 6 is obtained since the conductivities of the transistors are made always constant by detecting the $V_{CE}$ of the transistors $Q_1$ through $Q_4$, and $Q''_1$ through $Q''_4$.

FIG. 12 shows an embodiment in which the inventive Hall motor driving circuit is applied to a servo system. The same symbols are given to the circuit components which have the same configuration and operation as the circuit components shown in FIGS. 6, 8, 9 and 10 mentioned above. The difference between this embodiment and the above-mentioned embodiments is that in this embodiment, a bridge circuit is formed by the variable resistor $R_{102}$ whose resistance is varied in accordance with the rotation of a rotary shaft (not shown) of the motor and by the resistors $R_{101}$, $R_{103}$ and $R_{104}$ to detect the stage of the rotary position of the motor, and that the output terminal of the bridge circuit is connected to an operational amplifier OP. Further the output terminal of said operational amplifier is connected to the base of the transistor $Q_7$ forming a differential amplifier circuit which generates forward or backward run signals to bring the transistors $Q_A$ and $Q_B$ selectively into an ON state, thereby bringing one of the groups of transistors $Q_1$ through $Q_4$ and $Q''_1$ through $Q''_4$ of the initial stage of the driving transistors $Q'_1$ through $Q'_4$ into a driving state, so that the driving sequence of the field coils is controlled so as to generate fields for forward run or backward run to form a servo system.

Next, the operation of FIG. 12 will be explained. Assume that the rotational position of the motor has been displaced from a predetermined value and that the motor has overrun the predetermined position, that the resistance of the resistor $R_{102}$ has been reduced in accordance with the rotation of the rotary shaft of the motor (not shown), and that the potential of the point A has become higher than the potential of the point B. Then, since the potential of the output terminal of the operational amplifier becomes higher than the potential of the point C, the base potential of transistor $Q_7$ becomes higher than the base potential of the transistor $Q_8$ and, as a result, the transistor $Q_B$ is turned ON. This causes a current to be supplied to the transistor $Q'_6$, and $Q'_6$ is also turned ON, the transistors $Q_1$ through $Q_4$ connected to the Hall elements are put into an operating state and, as was explained in detail in the embodiment of FIG. 10, the field coils $L_1$ through $L_4$ are excited in a predetermined order to rotate the motor in the direction returning to the predetermined rotation position. In this case, the resistance of the resistor $R_{102}$ varies accordingly and, since the base potentials of the transistors $Q_A$ and $Q_B$ of the differential amplifier are equal to each other when the potentials at points A and B are equal, the transistors $Q_A$ and $Q_B$ are turned OFF and the motor stops rotation.

Contrary to the above-mentioned case, when the rotational position of the motor does not reach the predetermined position, the resistance is increased in response to the rotation of the rotary shaft (not shown) of the motor and when the potential of point B has become higher than the potential of point A, the potential of the output terminal of the operational amplifier becomes lower than the potential of point C. Accordingly, since the base potential of transistor $Q_8$ becomes higher than the base potential of $Q_7$, both the transistors $Q_A$ and $Q''_6$ are turned ON, the transistors $Q''_1$ through $Q''_4$ connected to the Hall elements are put into an operating state and, since the transistors $Q''_1$ through $Q''_4$ are connected to the transistor $Q'_1$ through $Q'_4$ in such a manner that their electrical angles differ by 180° from the driving transistor $Q'_1$ through $Q'_4$, to which the transistors $Q_1$ through $Q_4$ are connected, the motor runs in the direction opposite to the case described above toward the predetermined rotational position as was explained in detail in FIG. 10. In other words, the motor is so controlled as to always assume a constant rotational position. In this case, since the $V_{CE}$ voltages of driving transistors $Q'_1$ through $Q'_4$ are controlled by transistors $Q_5$, $Q'_6$ and $Q''_6$ as was described in detail in the embodiment of FIG. 9, the motor speed can be made to vary linearly with respect to the change in supply voltage and the change in load torque. In other words, this circuit is a motor driving circuit having excellent characteristics.

FIG. 13 shows anoter embodiment of the detector circuit used to detect the $V_{CE}$ or the conductivity of the driving transistor in the inventive Hall motor driving circuit. FIG. 13(a) shows a case in which a diode D is connected to the input terminal of the Hall element to compensate for the temperature characteristics of the element. FIG. 13 (b) shows a case in which ) R $\alpha$ and R $\beta$ are provided in place of the diodes $D_1$ through $D_4$ and the resistance of R $\alpha$ is made higher than that of R $\beta$ so that the voltage induced in coil $L_1$ when the transistor $Q_1$ is a rest state is compensated for not by the diodes $D_1$ through $D_4$ but by the resistor R $\alpha$. FIG. 13(c) shows a case in which a transistor $T_{rs}$ which is connected to a time constant circuit consisting of resistor $R_c$ and condenser $C_c$ in parallel with the resistor $R_1$ is provided to charge the condenser $C_1$ rapidly by way of $T_{rs}$ at the time of motor starting to compensate for the time lag at that time. FIG. 13 (d) shows a case in which transistors $Q_{D1}$ and $Q_{D2}$ are provided in place of the diodes $D_1$ through $D_4$ to indicate the conductivities of the driving transistors on the collector sides of said transistors $Q_{D1}$ and $Q_{D2}$.

Figure 14A:
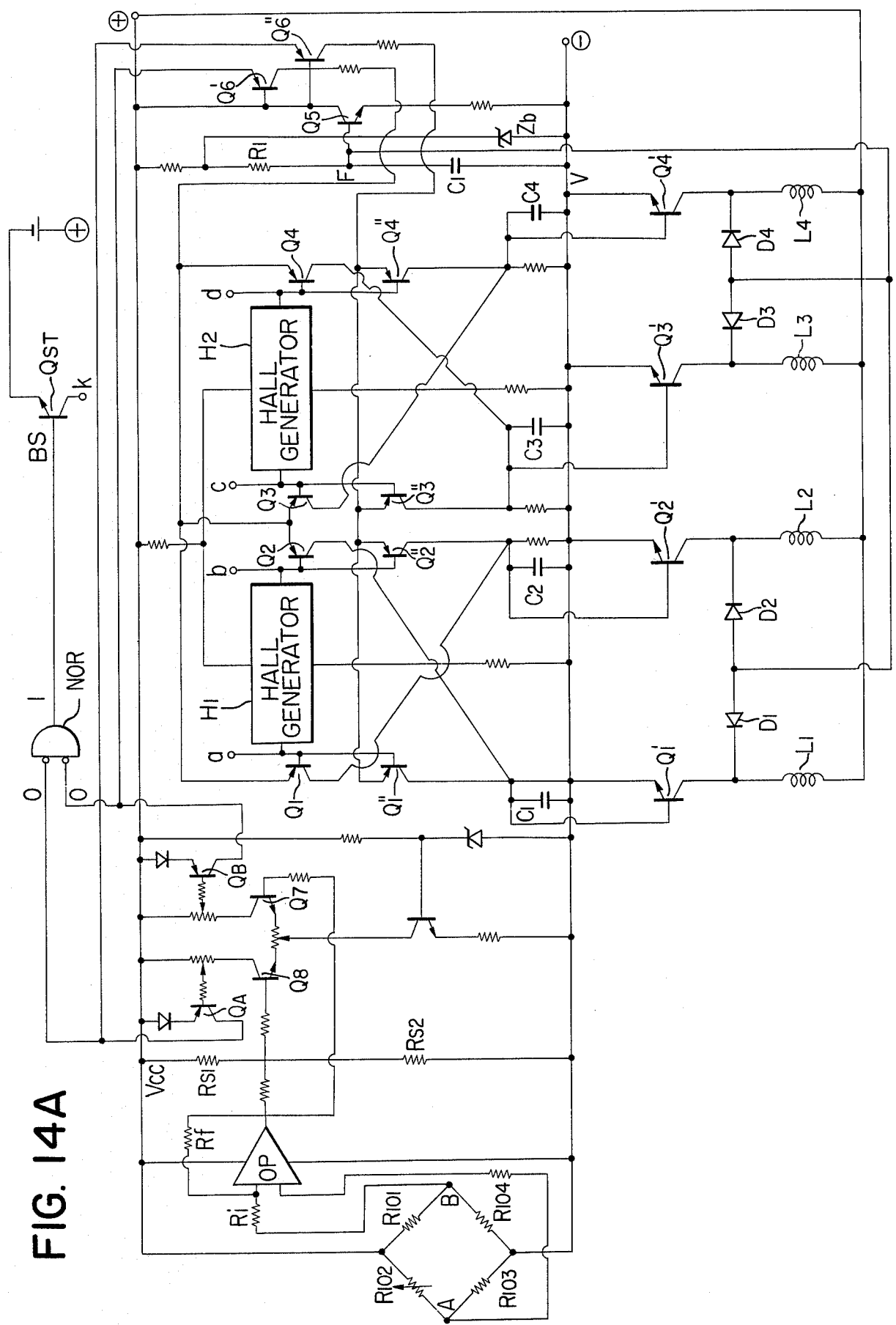
FIGS. 14A and 14B are circuit diagrams showing an embodiment in which a holding circuit is provided to hold the servomotor shown in FIG. 12 at a predetermined position.

FIGS. 14(a) and (b) show the cases in which a holding current is run through the coils $L_1$ through $L_4$ so that, when the servo motor shown in FIG. 12 has stopped at a predetermined position, the motor is held at said position. Although the elements having the same configuration and operation as the ones found in the circuit shown in FIG. 12 have the same symbols, in FIG. 14(a) a NOR gate NOR is provided at the output terminals of the transistors $Q_A$ and $Q_B$ and a switching transistor $Q_{ST}$ is connected to the output terminal of said NOR gate. The NOR gate is used to detect whether the motor has stopped at the predetermined position, or whether the outputs of transistors $Q_A$ and $Q_B$ are not present, to turn on the switching transistor $Q_{ST}$, to form feed path to the current holding transistors $Q_{1a}$ through $Q_{4a}$ shown in FIG. 14(b), and to let the holding current run through the coils $L_1$ through $L_4$.

Figure 14B:
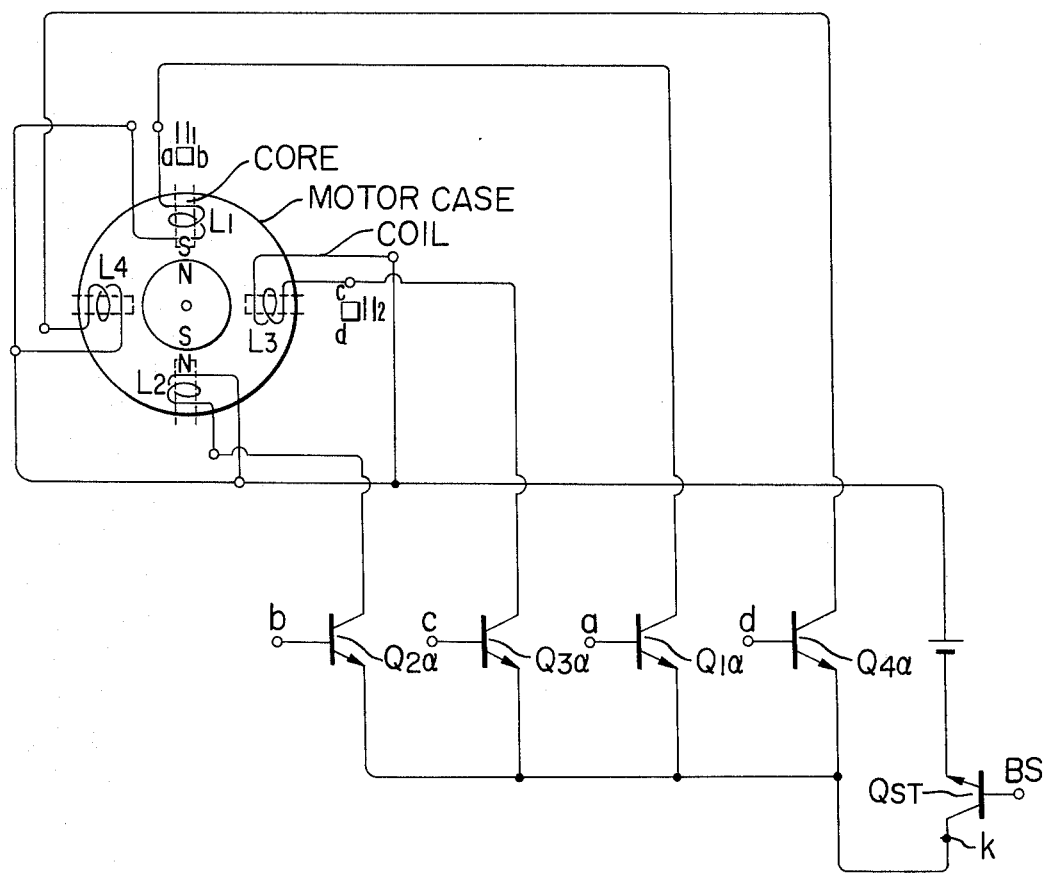
Figure 15:
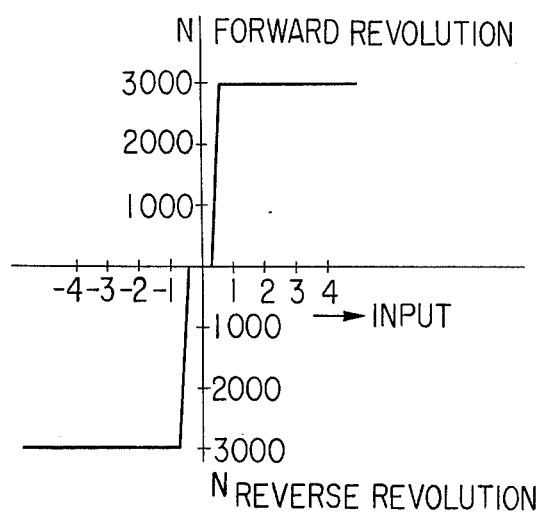
FIG. 15 is a characteristic drawing showing the characteristics of the servomotor shown in FIG. 14.

Next, the operation of the embodiment of FIG. 14 will be explained. Assume that the servo system is stabilized when the rotor is at the position shown in FIG. 14(b) and that the rotation of the motor has stopped. Then, since the outputs of the transistors $Q_A$ and $Q_B$ of FIG. 14(a) are absent, the output of NOR gate becomes "1" and the transistor $Q_{ST}$ is turned ON. Therefore a feed path is formed to the transistors $Q_{1a}$ through $Q_{4a}$. On the other hand, since the rotor is stopped at the position shown in FIG. 14(b), a Hall current is generated at a of the Hall element $H_1$, the transistor $Q_{1a}$ is turned ON, a current runs through the coil $L_1$ and a magnetic field is generated on said coil $L_1$ to hold the N pole of the rotor at said position. in this way since the embodiment shown in FIG. 14 is so designed as to hold the motor to the predetetermined position when the motor has stopped at said position, it is possible to stop the motor at the predetermined position positively and, as shown in FIG. 15, it is possible to prevent the motor from hunting, etc. even when the servo motor is in an insensible zone.

As has already been described in detail, in the Hall motor driving circuit according to the present invention, the conductive state of a driving transistor connected to a field coil is detected and control is made so that said conductive state always has a predetermined value or predetermined $V_{CE}$ voltage. Therefore in the cases where the supply voltage has been increased or the load torque has been increased, the current running through the driving coil varies linearly. Accordingly, in doing speed adjustment, the speed can be varied in proportion to supply voltage, etc. and, since the $V_{CE}$ of the driving transistor is constant, wasteful power consumption does not occur in the transistor. Moreover, since the transistor is not saturated, irregularity in torque can be dissolved. The present invention provides a great advantage in a Hall motor driving circuit.

I claim:

1. A DC motor controlled by a Hall generator comprising:
   a rotor having magnetic poles of opposite polarities thereon;
   a stator including flux-producing windings positioned in torque-producing relation to said rotor;
   Hall generators disposed within said motor in flux-sensing relation to said magnetic poles so as to generate rotor position signals;
   driving means having terminals coupled in series to respective ones of said windings for applying exciting currents to said windings in response to the position signals from said Hall generators; and
   control circuit means coupled to said driving means for detecting a voltage corresponding to a respective terminal voltage of said driving means and to maintain the terminal voltage substantially constant.

2. A DC motor controlled by a Hall generator in accordance with claims 1, further comprising amplifying means coupled to said Hall generators for generating output signals in response to the rotor position signals, said driving means applying exciting currents to said windings in response to the output of said amplifying means.

3. A DC motor controlled by a Hall generator in accordance with claim 2, wherein said control circuit further includes:
   detecting means operative to detect the terminal voltage of said driving means;
   a reference voltage source having a predetermined output reference voltage;
   comparison circuit means for comparing the output of said detecting means with the output of said reference voltage source and to generate a signal corresponding to the difference between the two said outputs; and
   regulating means for regulating the input to said amplifying means in with to the output of said comparison circuit. to 4. A DC motor controlled by a Hall generator in accordance ith claim 1, wherein said DC motor is further provided with rotational direction control circuit means coupled to said driving means and having at least two input terminals for reversing the order of application of driving currents to said windings in response t signals selectively applied to each of said input terminals.

5. A DC motor controlled by a Hall generator comprising:
   a rotor having magnetic poles of opposite polarities thereon;
   a stator including flux-producing windings positioned in torque-producing relation to said rotor;
   Hall generators disposed within said motor in flux-sensing relation to said magnetic poles so as to generate rotor position signals;
   driving means having terminals coupled in series to respective ones of said windings for applying exciting current to said windings in response to the position signals from said Hall generators;
   detecting means coupled to said driving means to detect respective terminal voltages of said driving means;
   a reference voltage source having a predetermined output reference voltage;
   comparison circuit means for comparing the output of said detecting means with the output of said reference voltage source and to generate a signal corresponding to the difference between the two said outputs; and
   regulating means for regulating the inputs to said Hall generators in response to the output of said comparison circuit and for maintaining the terminal voltage of said driving means substantially constant.

6. A DC motor controlled by a Hall generator in accordance with claim 5, further including level shifting means coupled between said detecting means and said comparison circuit for shifting the output of said detecting means by a predetermined level.

7. A DC motor controlled by a Hall generator in accordance with claim 6, wherein said level shifting means contains a constant current circuit and a resistor coupled between said circuit and said detecting means.

8. A DC motor controlled by a Hall generator comprising:
   a rotor having magnetic poles of opposite polarities thereon;
   a stator including flux-producing windings positioned in torque-producing relation to said rotor;
   Hall generators disposed within said motor in flux-sensing relation to said magnetic poles so as to generate rotor position signals;
   first selectable driving means having terminals coupled to respective ones of said windings for applying exciting currents to said windings in a predetermined sequence in response to the position signals from said Hall generators, so as to effect rotation in a given direction;
   second selectable driving means having terminals coupled to respective ones of said windings for applying exciting currents to said windings in a sequence which differs by 180° in electrical angle from said predetermined sequence, so as to effect rotation in the opposite direction;

first switching means having a first input terminal for forming an electric current path operative to select said first driving means in response to a signal applied to the first input terminal;

second switching means having a second input terminal for forming an electric current path operative to select said second driving means in response to signal applied to the second input terminal; and control circuit means coupled to each of the two said driving means for detecting a voltage corresponding to a respective terminal voltage of the selected one of said first and second driving means and for maintaining the terminal voltage substantially constant.

9. A DC motor controlled by a Hall generator comprising:

a rotor having magnetic poles of opposite polarities thereon;

a stator including flux-producing windings positioned in torque-producing relation to said rotor;

Hall generators disposed within said motor in flux-sensing relation to said magnetic poles so as to generate rotor position signals;

driving means having terminals coupled in series to respective ones of said windings for applying exciting currents to said windings in response to the position signals from said Hall generators;

detecting means coupled to said driving means for detecting respective terminal voltages of said driving means; and regulating means for regulating the inputs to said Hall generators in response to the output of said detecting means wherein the inputs to the Hall generators are regulated by said regulating means so that corresponding terminal voltages of said driving means are maintained substantially constant.

10. A DC motor controlled by a Hall generator in accordance with claim 9, wherein said regulating means comprises:

a reference voltage source having a predetermined output reference voltage; and comparison circuit means for comparing the output of said detecting means with the output of said reference voltage source and to generate a signal corresponding to the difference between two said outputs, wherein said regulating means regulates the inputs to the Hall generators in response to the output of said comparison circuit.

11. A DC motor controlled by a Hall generator in accordance with claim 10, wherein said comparison circuit comprises a differential amplifier.

12. A DC motor controlled by a Hall generator in accordance with claim 9, wherein said detecting means comprises a diode.

13. A DC motor controlled by a Hall generator in accordance with claim 9, wherein said detecting means comprises a transistor.

14. A DC motor controlled by a Hall generator comprising:

a rotor having magnetic poles of opposite polarities thereon;

a stator including flux-producing windings positioned in torque-producing relation to said rotor;

Hall generators disposed within said motor in flux-sensing relation to said magnetic poles so as to generate rotor position signals;

driving means having terminals coupled to respective ones of said windings for applying exciting currents to said windings in response to the position signals from said Hall generators;

a rotational direction control circuit having two input terminals and being operative reverse the order of application of driving currents to said windings in response to signals applied to each of said input terminals;

a servo element coupled to the input terminals of said rotational direction control circuit and to said DC motor for applying directional signals to the input terminals of said rotational direction control circuit in response to the rotational position of said motor, wherein said motor is controlled to assume a predetermined rotational position; and control circuit means coupled to said driving means for detecting a voltage corresponding to a respective terminal voltage of said driving means for maintaining the terminal voltage substantially constant.

15. A DC motor controlled by a Hall generator in accordance with claim 14 further comprising a holding circuit coupled to said windings for applying holding currents through said windings, the currents being operative to form a magnetic field which holds the rotor at a predetermined rotational position when said rotor is at said position.

16. A DC motor controlled by a Hall generator comprising:

a rotor having magnetic poles of opposite polarities thereon;

a stator including flux-producing windings positioned in torque-producing relation to said rotor;

Hall generators disposed within said motor in flux-sensing relation to said magnetic poles so as to generate rotor position signals;

first selectable driving means having terminals coupled to respective ones of said windings for applying exciting currents to said windings in a predetermined sequence in response to the position signals from said Hall generators, so as to effect rotation in a given direction;

second selectable driving means having terminals coupled to respective ones of said windings for applying exciting currents to said windings in a sequence which differs by 180° in electrical angle from said predetermined sequence, so as to effect rotation in the opposite direction;

first switching means having a first input terminal for forming an electric current path operative to select said first driving means in response to a signal applied to the first input terminal; and second switching means having a second input terminal for forming an electric current path operative to select said second driving means in response to a signal applied to the second input terminal.

17. A DC motor controlled by a Hall generator comprising:

a rotor having magnetic poles of opposite polarities thereon;

a stator including flux-producing windings positioned in torque-producing relation to said rotor;

Hall generators disposed within said motor in flux-sensing relation to said magnetic poles so as to generate rotor position signals;

driving means having terminals coupled to respective ones of said windings for applying exciting currents to said windings in response to the position signals from said Hall generators;

rotational direction control circuit means coupled to said driving means and having two input terminals for reversing the order of application of driving currents to said windings in response to signals applied to each of said input terminals so that the direction of rotation of the motor may be reversed;

a servo element coupled to the input terminals of said rotational direction control circuit and to said DC motor for applying directional signals to the input terminals of said rotational direction control circuit in response to the rotational position of said motor, wherein said motor is controlled to assume a predetermined rotational position in response to said directional signals.

18. A DC motor controlled by a Hall generator in accordance with claim 17, further comprising a holding circuit coupled to said windings and being operative to apply holding currents to said windings so that the holding currents form a magnetic field arranged to maintain the rotor of the motor at a predetermined rotational position when said motor is at said position.

* * * * *

UNITED STATES PATENT OFFICE
CERTIFICATE OF CORRECTION

Patent No. 4,039,911  Dated August 2, 1977

Inventor(s) KINJI TANIKOSHI

It is certified that error appears in the above-identified patent and that said Letters Patent are hereby corrected as shown below:

Column 5,  line 45, "references to read -- reference --;

line 59, after " $Q'_4$," add -- and --;

Column 6,  lines 48 and 49, after the word "Thereafter" add -- a --;

line 58, "$Q_1$-$Q_4$" to read -- $Q''_1$-$Q''_4$ --;

Column 8,  lines 7 and 9, "transistor" to read -- transistors --

Column 9,  line 7, "in" to read -- In --;

Column 10, line 3, delete "to";

line 9, "t" to read -- to --.

Signed and Sealed this

*Eighteenth* Day of *October 1977*

[SEAL]

*Attest:*

RUTH C. MASON
*Attesting Officer*

LUTRELLE F. PARKER
*Acting Commissioner of Patents and Trademarks*